Jan. 24, 1967 C. G. DAVIS ETAL 3,300,578

DATA TRANSMISSION

Filed June 12, 1963

INVENTORS C. G. DAVIS
E. E. SUMNER
L. C. THOMAS

BY Leonard M. Arnold
ATTORNEY

3,300,578
DATA TRANSMISSION

Claude G. Davis, Colts Neck Township, Monmouth County, Eric E. Sumner, North Caldwell, and Lewis C. Thomas, North Plainfield, N.J., assignors to Bell Telephone Laboratories, Incorporated, New York, N.Y., a corporation of New York Filed June 12, 1963, Ser. No. 287,281
4 Claims. (Cl. 178—3)

This invention relates to data transmission and more particularly to the transmission of binary data on a pulse transmission system employing self-timed repeaters.

The pulse transmission system described in the January 1962 issue of the Bell System Technical Journal, by C. G. Davis, in "An Experimental Pulse Code Modulation System for Short Haul Trunks," pages 1–24, and by J. S. Mayo in "A Bipolar Repeater for Pulse Code Modulation Signals," pages 25–97, appears to be ideally suited for the transmission of data from one source, such as a data tape, to a distant store or utilization device; since it transmits information in digital form. Such transmission is not easily accomplished, however, since the transmission system employs, for retiming the transmitted signal, regenerated repeaters that are self timed in the sense that they derive their clock signals from the transmitted signal itself. In order to successfully derive this clock signal a marking or ON pulse must be received at least once every fifteen time slots, and any lapse in transmission for a greater period renders the system inoperative.

Under known techniques for handling binary data it is not possible to avoid this lapse in transmission. The standard data tape currently in use employs seven tracks of information so that seven-bit characters of data appear in parallel across the tape. The speed of the tape is quoted in terms of characters per second and the maximum speed presently obtainable with commercially available equipment is approximately 62.5 kilocharacters per second, the serial transmission of which requires a pulse repetition rate of 437.5 kilobits per second. This speed is not constant, however, and the speed at which data are read off the tape may be considerably less due to acceleration and deceleration of the tape and to stretching and twisting of the tape. The pulse repetition rate of the above-mentioned transmission system is 1.544 megabits per second, which is more than twice that of the fastest available tape equipment. While buffer storage systems are known which are capable of transferring data from a tape operating at one speed to a device operating at a second and higher speed these systems are capable only of transferring blocks of data at the higher speed with substantial time gaps between the transfer of data. Since the above-mentioned transmission system operates at more than twice the pulse repetition rate of the fastest available tape equipment such techniques cannot be employed since the resulting time gaps introduced in the signals applied to the transmission system would render its repeaters inoperative.

It is an object of this invention to transmit binary data from a source, such as a data tape, to a utilization device over a regenerative pulse transmission system employing self-timed regenerative repeaters.

In accordance with this invention binary data appearing on a data tape are transmitted over a regenerative pulse transmission system having a pulse repetition rate higher than that at which the data can be read from the tape, by transmitting a train of pulses of a first pulse pattern in response to a data marking pulse or ON pulse and transmitting a train of pulses of a second pulse pattern in response to a data marking space or OFF pulse. At the receiver a data marking pulse is generated when the first pulse pattern is received and a data marking space is generated when the second pulse pattern is received. In a preferred embodiment of the invention a continuous train of marking or ON pulses, one in each time slot of the transmission system, is transmitted in response to a data marking pulse, and a train of marking pulses and marking spaces in alternate time slots is transmitted in response to a data marking space. By transmitting such pulse trains the proper operation and timing of the self-timed repeaters of the system are insured since at least one marking or ON pulse will occur in every second time slot.

This invention will be more fully comprehended from the following detailed description of a preferred embodiment thereof taken in conjunction with the appended drawings, in which.

Figures 1A, 1B, 2:
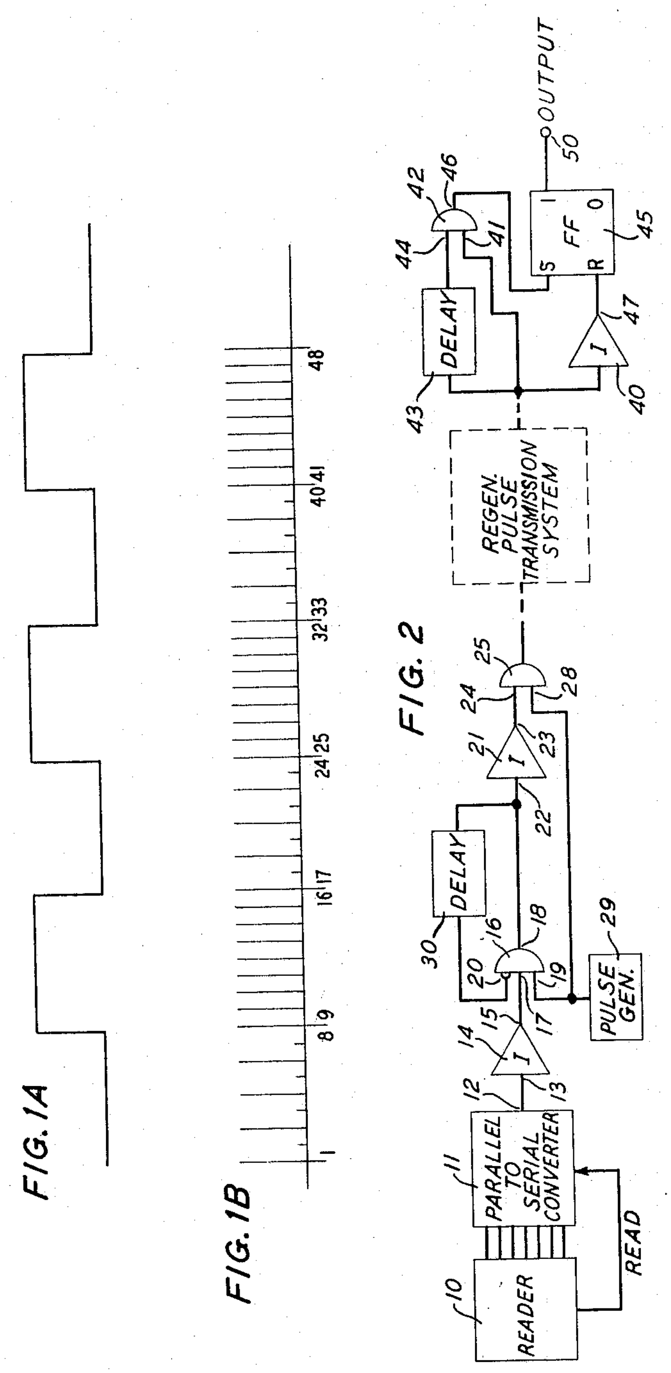
FIG. 1A illustrates a binary data input signal in serial form.
FIG. 1B illustrates the signal to be transmitted over the regenerative transmission system in response to the signal shown in FIG. 1A.
FIG. 2 is a data transmission system embodying the present invention.

The pulse transmission system described in the above-mentioned articles in the January 1962 issue of the Bell System Technical Journal operates at a speed of 1.544 megabits per second and employs clock signal generators at each of its terminals to generate marking or ON pulses at that frequency, thus establishing the time slots for the system. As contemplated by this invention, the principal use for data transmission over such a system would be in the field of transferring data from a data tape to a utilization device at a distant location. Generally, seven-bit characters of binary data are recorded in parallel across the data tape with each bit comprising either a marking pulse or marking space. A marking or ON pulse is the presence of a relatively high voltage level, while a marking space is the absence of a pulse (i.e., OFF pulse) or the presence of a relatively low voltage level.

The data are read from a data tape by a data tape reader 10, shown in block diagram form in FIG. 2, which has seven output terminals at which appear the seven bits which make up a data character. These seven bits of data are applied to a parallel-to-serial converter 11 and when the data has been so applied to the reader 10 generates a read signal at a read terminal. Under the control of the read signal from reader 10 the parallel-to-serial converter 11 converts the seven-bit parallel input signal character to a seven-bit serial output signal. The output terminal 12 of the converter 11 is connected to the input terminal 13 of a NOT or INVERTER circuit 14 which produces a marking space or low voltage level at its output terminal 15 in response to a data marking pulse at its input terminal 13 and a high voltage level in response to a data marking space at its input terminal.

When a data marking pulse is applied to the input terminal 13 of NOT circuit 14 it is converted to a low voltage level. A NOT-AND or INHIBIT gate 16 one of whose input terminals 17 is connected to the output terminal 15 of NOT circuit 14, produces a high voltage level at its output terminal 18 only if high voltage levels are simultaneously applied to its input terminals 17 and 19 and a low voltage level is applied to its inhibitor terminal 20. As a result of the application of a low voltage level to input terminal 17 a low voltage level appears at the output terminal 18 of gate 16. This low voltage level is converted to a high voltage level, or marking pulse, by the action of a second NOT circuit 21 whose input terminal 22 is connected to the output terminal 18 of gate 16. The output terminal 23 of NOT circuit 21 is connected to one input terminal 24 of an AND gate 25 whose second input terminal 28 is connected to a 1.544 megabit per second clock source 29 of marking pulses. As a result, during the next occurring time slot of the transmission system a marking pulse is transmitted over the system. Under the control of source 29 marking pulses are applied to the transmission system so long as a data marking pulse is applied to input terminal 13 of NOT circuit 14 since this results in the application of a high voltage level to input terminal 24 of AND gate 25.

When a data marking space appears at output terminal 12 of converter 11 NOT circuit 14 produces a high voltage level output which is applied to input terminal 17 of gate 16. Since input terminal 19 of gate 16 is connected to the 1.544 megabit per second source 29 of clock pulses a high voltage level is produced at output terminal 18 of gate 16 which results in a low voltage level at output terminal 23 of NOT circuit 21. This low voltage level disables AND gate 25 so that a low voltage level or marking space is applied to the transmission system in a first time slot following the application of a data marking space to NOT circuit 14.

The high voltage level at the output terminal 18 of gate 16 is also applied to a delay circuit 30 which delays the signal by one time slot and applies the delayed signal to inhibitor terminal 20 of gate 16 so that gate 16 is inhibited during the time slot which follows the transmission of a marking space over the transmission system. As a result during this next time slot, gate 16 produces a low voltage level and in response thereto NOT circuit 21 generates a high voltage level, or marking pulse, which is transmitted over the transmission system. This sequence of marking pulses and marking spaces in alternate time slots continues as long as a data marking space is present at the output terminal 12 of converter 11.

A binary data pulse signal is shown in FIG. 1A, and represents data read from the data tape and serialized by the action of converter 11. The resulting pattern of marking pulses and marking spaces applied to the regenerative transmission system is shown in FIG. 1B, where the time slots of the transmision system have been numbered 1 through 48. Continuous marking pulses are applied to the pulse transmission system when a data marking pulse is present at output terminal 12 of converter 11 (e.g., during time slots 9 through 16) and marking pulses and marking spaces in alternate time slots are apllied to the transmission system when a data marking space is present (e.g., during time slots 17 through 24). The latter train of pulses is transimtted even in the absence of binary data and insures that a marking pulse is present in at least every other time slot which insures the proper operation of the self-timed repeaters in the transmission system.

Since the self-timed repeaters of the regenerative pulse transmission system described in the above-mentioned articles in the January 1962 issue of the Bell System Technical Journal require the reception of a minimum of one marking pulse in every fifteen time slots in order to operate properly it should now be obvious to one skilled in the art from the teaching of the above-described embodiment of the invention that pulse signals other than those described in connection with the embodiment of the invention shown in FIG. 2 may be transmitted in response to data marking pulses and spaces without departing from the spirit and scope of the present invention.

After transmision over the regenerative pulse transmission system the pulse signals shown in FIG. 1B are applied in parallel to a NOT circuit 40, one input terminal 41 of an AND gate 42, and to a delay circuit 43. The delay circuit provides a delay of one time slot and its output terminal is connected to the input terminal 44 of the AND gate 42. A multivibrator or flip-flop circuit 45 which has set and reset terminals respectively designated S and R and two output terminals designated "1" and "0" are provided. The S terminal is connected to the output terminal 46 of AND gate 42 and the R terminal is connected to the output terminal 47 of NOT circuit 40. The application of a marking pulse to the S input terminal of the multivibrator 45 sets the multivibrator with its "1" output at a relatively high voltage level and its "0" output established at a relatively low voltage level. The application of a high voltage level to the R input resets the multivibrator so that it assumes its reverse conditions.

In response to the transmission of two consecutive marking puplses AND gate 42 is actuated upon the occurrence of the second of these two transmitted marking pulses due to the application of the delayed first marking pulse to its input terminal 44 and the application of the second marking pulse to its input terminal 41. As a result, a relatively high voltage level is generated at output terminal 46 of AND gate 42 which sets the multivibrator 45 so that a high voltage level or marking pulse is generated at output terminal 50. Thus, a data marking pulse is generated at output terminal 50 in response to the reception of two consecutive marking pulses from the regenerative tranmission system. The output terminal 50 will remain at a high voltage level as long as continuous marking pulses are received.

When a marking space is transmitted over the regenerative transmission system a relatively high voltage level is generated at output terminal 47 of NOT circuit 40 and as a result the flip-flop or multivibrator 45 is reset so that a relatively low voltage level or marking space is applied to output terminal 50. Thus in response to a first transmitted marking space a data marking space is generated. Since the transmission of a data marking space in this preferred embodiment of the invention is accomplished by the transmission of marking pulses and marking spaces in alternate time slots of the transmission system a marking pulse will follow the transmission of a marking space but this single marking pulse does not actuate any additional circuitry since two consecutive marking pulses are required to activate AND gate 42. Thus, marking pulses and marking spaces in alternate time slots serve to leave the multivibrator 45 in its reset condition so that a low voltage level or space is generated at output terminal 50. The reconstructed data in serialized form which is generated at output terminal 50 may be applied to a utilization device.

The tape reader 10 may be that described in International Business Machines Customer Engineering Reference Manual, Tape Adapter Unit, January 1961, copyright 1961, by International Business Machines Corporation. The INHIBIT gate 16 may be that described on page 403 of "Pulse and Digital Circuits," by Millman and Taub, published by the McGraw-Hill Book Company, 1956, while the NOT or INVERTER circuits may be those shown on page 401 of that text. The parallel-to-serial converter 11 may be that disclosed in United States Patent 2,782,305, issued to B. L. Havens and C. R. Borders on February 19, 1957.

Thus in accordance with this invention data from a data tape are processed so that the data may be transmitted over a regenerative pulse transmission system employing self-timed repeaters. Since marking pulses are applied to the transmission system at the pulse repetition rate of the transmission system when a data marking pulse is present and since marking pulses and marking spaces are transmitted in alternate time slots when a data marking space is present or no data is present, a marking pulse is received by the repeaters in at least every other time slot and the proper operation of the self-timed repeaters of the transmission system is insured.

It is to be understood that the above-described arrangements are illustrative of the application of the principles of the invention. Numerous other arrangements may be devised by those skilled in the art without departing from the spirit and scope of the invention.

What is claimed is:

1. In combination, a synchronous regenerative pulse transmission system for transmitting marking pulses and marking spaces in time slots and employing self-timed repeaters, a source of binary data having a pulse repetition rate which is nonsynchronous with respect to the pulse repetition rate of said synchronous transmission system, means connected between the input of said transmission system and said source to begin to generate before the lapse of a time interval equal to the time duration of a time slot of said transmission system a pulse train of a first pulse signal pattern in response to the generation of a data marking pulse by said source and a pulse train of a second pulse signal pattern in response to the generation of a data marking space by said source, and means at the output of said transmission system to generate before the lapse of a time interval greater than the time duration of a time slot of said transmission system a data marking pulse in response to the reception of said first pulse signal pattern and a data marking space in response to the reception of said second pulse signal pattern.

2. In combination, a synchronous regenerative pulse transmission system employing self-timed repeaters, a source of binary data having a pulse repetition rate which is nonsynchronous with respect to the pulse repetition rate of said synchronous transmission system, means connected between the input of said transmission system and said source to generate a train of regularly recurring marking pulses one in each time slot of said transmission system in response to a data marking pulse from said source and to generate a pulse train of marking pulses and marking spaces in alternate time slots of said transmission system in response to a data marking space from said source, and means at the output of said transmission system to generate a data marking pulse in response to the reception of regularly recurring marking pulses one in each time slot of said transmission system and to generate a data marking space in response to the reception of marking pulses and marking spaces in alternate time slots of said transmission system.

3. In combination, a synchronous regenerative pulse transmission system employing self-timed repeaters, a source of binary data having a pulse repetition rate which is non-synchronous with respect to the pulse repetition rate of said synchronous transmission system, means connected between the input of said transmission system and said source to generate a train of regularly recurring marking pulses one in each time slot of said pulse transmission system in response to a data marking pulse from said source and to generate a signal of marking pulses and marking spaces in alternate time slots of said transmission system in response to a data marking space comprising, a first NOT circuit to convert data marking pulses to data marking spaces and data marking spaces to data marking pulses, a NOT-AND gate having two input terminals, an inhibitor terminal and an output terminal, connections from the output terminal of said NOT circuit to one input terminal of said NOT-AND gate, a second NOT circuit, connections from the output terminal of said NOT-AND gate to the input terminal of said second NOT circuit, a source of clock marking pulses generated at the pulse repetition frequency of said transmission system in regularly recurring time slots, means connecting the output terminal of said source of clock pulses to the second input terminal of said NOT-AND gate so that during the presence of a data marking space at the input terminal of said first NOT circuit said NOT-AND gate is enabled and the output signal at the output terminal of said second NOT circuit is a marking space, an AND gate having two input terminals, means connecting the output terminal of said second NOT circuit to one input terminal of said AND gate, means connecting said second input terminal of said AND gate to said source of clock marking pulses so that the presence of a marking pulse at the output terminal of said second NOT circuit in response to the application of a data marking pulse applied to the input terminal of said first NOT circuit actuates said AND gate to produce a train of continuously recurring marking pulses at the pulse repetition frequency of said transmission system at its output terminal, a delay circuit connected between the output terminal of said NOT-AND gate and the inhibitor terminal of said NOT-AND gate to inhibit the output signal from said NOT-AND gate for one time slot after said NOT-AND gate produces a data marking pulse output signal so that said AND gate is disabled during every other time slot during the presence of a data marking space at the input terminal of said first NOT circuit, and means at the output of said transmission system to generate a data marking pulse in response to the reception of said train of regularly recurring marking pulses one in each time slot of said transmission system and to generate a data marking space in response to the reception of a signal of marking pulses and marking spaces in alternate time slots.

4. In combination, a synchronous regenerative pulse transmission system employing self-timed repeaters, a source of binary data having a pulse repetition rate which is nonsynchronous with respect to the pulse repetition rate of said synchronous transmission system, means connected between the input of said transmission system and said source to generate a train of regularly recurring marking pulses one in each time slot of said transmission system in response to a data marking pulse from said source and to generate a signal of marking pulses and marking spaces in alternate time slots in response to a data marking space from said source, and means at the output of said transmission system to generate a data marking pulse in response to the reception of said train of regularly recurring marking pulses and to generate a data space in response to the reception of marking pulses and marking spaces in alternate time slots comprising, a NOT circuit which converts transmitted marking spaces to marking pulses, a bistable circuit having an output terminal, a first input terminal to which the application of a marking pulse causes the generation of a marking space at said output terminal and a second input terminal to which the application of a marking pulse causes a marking pulse to be generated at said output terminal, means to connect the output terminal of said NOT circuit to said first input terminal of said bistable circuit so that the reception of a marking space from said transmission medium causes a data marking space to be generated at the output terminal of said bistable circuit, a delay circuit which delays transmitted marking pulses by one time slot, and an AND gate having two input terminals one terminal of which is connected to receive said delayed marking pulses and the second terminal connected to receive said transmitted signals and an output terminal connected to said second input terminal of said bistable circuit so that upon the occurrence of transmitted marking pulses in successive time slots a data marking pulse is generated.

References Cited by the Examiner

UNITED STATES PATENTS 3,139,607 6/1964 Grondin ............ 178—3

NEIL C. READ, *Primary Examiner.*

THOMAS A. ROBINSON, *Examiner.*